(12) United States Patent
Furuhashi

(10) Patent No.: US 6,374,821 B1
(45) Date of Patent: Apr. 23, 2002

(54) LIQUID HEATING APPARATUS

(75) Inventor: Toshio Furuhashi, Shizuoka-ken (JP)

(73) Assignee: Eiken Industries Co. Ltd. (JP)

( * ) Notice: Subject to any disclaimer, the term of this patent is extended or adjusted under 35 U.S.C. 154(b) by 0 days.

(21) Appl. No.: 09/198,768

(22) Filed: Nov. 24, 1998

(30) Foreign Application Priority Data

Nov. 26, 1997 (JP) ............................................ 9-339479

(51) Int. Cl.$^7$ ................................................ A47J 37/12
(52) U.S. Cl. ............................... 126/376.1; 126/390.1; 99/403; 165/185
(58) Field of Search ............................ 126/345, 391.1, 126/376.1, 390.1; 99/403, 408; 165/185

(56) References Cited

U.S. PATENT DOCUMENTS

| | | | |
|---|---|---|---|
| 2,569,112 A | | 9/1951 | Miller et al. |
| 3,217,633 A | | 11/1965 | Anetsberger |
| 3,760,793 A | * | 9/1973 | Anetsberger et al. ....... 126/391 |
| 3,990,433 A | | 11/1976 | Keating |
| 4,628,903 A | * | 12/1986 | Farnsworth et al. ..... 126/391.1 |
| 4,825,813 A | * | 5/1989 | Yoshinari et al. ........... 122/6 A |

FOREIGN PATENT DOCUMENTS

| | | | |
|---|---|---|---|
| CH | 442 655 | | 1/1968 |
| EP | 0 159 750 | | 10/1985 |
| GB | 2098856 | * | 12/1982 ................. 99/403 |
| JP | 56-37496 | | 9/1981 |
| JP | 61-45046 | | 3/1986 |
| JP | 61-64837 | | 5/1986 |

OTHER PUBLICATIONS

U.S. Patent application 06/734,284 to Farnsworth et al. (cited in the U.S. Pat. No. 4,628,903) Dec. 1986.*

Copy of European Search Report dated Mar. 9, 1999.

* cited by examiner

*Primary Examiner*—Sara Clarke
(74) *Attorney, Agent, or Firm*—Harness, Dickey & Pierce, P.L.C.

(57) ABSTRACT

A liquid heating apparatus is provided in which fins are directly secured and fixed at the bottom portion of a liquid tank to ensure sufficient heat efficiency with production cost reduced by simplification of the construction thereof and with maintenance being easily carried out. In the liquid heating apparatus which raises the temperature of liquid in a liquid tank by heating the bottom of said liquid tank with a burner disposed downward of the bottom of said liquid tank, an inclination plane which is inclined at a predetermined degree of angle and is formed on the bottom of said liquid tank, and long fins are fixed on the rear side of said inclination plane along the inclination direction thereof. The fins are provided with thermal expansion absorbing capabilities along the lengthwise direction thereof. The fins can be formed with channel-like cross sections, and the bottom wall portions thereof are fixed close to the rear side of the inclination plane of the liquid tank. The thermal expansion absorbing means can be slits formed at the side wall portions protruding from the rear side of the inclination plane of the fins or can be formed of protrusion dimension differences at both end portions in the lengthwise direction of the fins.

11 Claims, 8 Drawing Sheets

PRIOR

PRIOR ARTS

LIQUID HEATING APPARATUS

FIELD OF THE INVENTION

The present invention relates to a liquid heating apparatus of, for example, a food frying machine, noodle boiling equipment, etc., and in particular a liquid heating apparatus which is able to efficiently heat liquid in a liquid tank.

BACKGROUND AND SUMMARY OF THE INVENTION

Conventionally, a food frying machine acting as a liquid heating apparatus for frying foods with edible oil stored in an oil reservoir is disclosed by, for example, Japanese Laid-open Utility Model No. 64837 of 1986. The food frying machine 51 is, as shown in FIG. 11 (PRIOR ART), such that a reservoir portion 54 which accumulates sediment remaining in an oil tank 52 is formed so as to protrude downward from one end side of the bottom 53 of the oil tank 52, a concave heat leading passage 56 which leads heat from a burner 55 is formed so as protrude upward along the lengthwise direction of the rear side of the bottom 53 of the oil tank 52, and a fin 57 having a cross-shaped section is fixed in the heat leading passage 56.

Another conventional example is disclosed by, for example, Japanese Laid-open Utility Model No. 45046 of 1986. The food frying machine 151 is, as shown in FIG. 12 (PRIOR ART), composed of a burner 154 disposed downward of a roughing flat bottom 153a of an oil tank 153 accommodated and disposed in the casing 152, and a combustion chamber 156 which heats oil 155 in the oil tank 153 by the burner 154, wherein a reservoir portion 157 which accumulates sediment in the oil tank 153 is formed so as to protrude downward in the direction from the bottom portion 153a of the oil tank 153 toward the combustion chamber 156, a heat insulating member 158 is provided at the surrounding of the reservoir portion 157, and a fin 159, which protrudes toward the combustion chamber 157, is provided at the bottom portion 153a.

However, in the food frying machine 51, since a fin 57 can not be fixed close to the bottom portion 53, there is a problem in that sufficient heat efficiency can not be obtained. That is, since the food frying machine 51 has such a structure that the fin 57 is formed by uniting two long plate members so that the cross section thereof is cross-shaped, and the fin 57 is disposed in a concave heat leading passage 56 on the bottom portion 53, it is difficult for the fin 57 to be directly fixed inside the heat leading passage 56.

Furthermore, even though the fin 57 is fixed directly inside the heat leading passage 56, the contact area between the fin and the interior of the heat leading passage 56 is only equivalent to the plate thickness of the two plate members, and in a case where the fin 57 is directly fixed, there is a possibility that the fin 57 is warped in the lengthwise direction due to heat expansion to cause the bottom portion 53 of the oil tank 52 to be deformed. Therefore, the fin 57 must be fixed with appointed space remaining between the outer circumferential end of the fin 57 and the interior of the heat leading passage 56, wherein the heat transmission area made effective by the fin 57 can not be made large, and it becomes difficult to obtain sufficient heat efficiency.

Furthermore, since the fin 57 itself is complicated and is cross-shaped in its cross section, the production cost thereof is increased, and since it is necessary to form a concave heat leading passage 56 at the bottom portion 53 of the oil tank 52, the production cost of the oil tank 52 is also increased, and therefore causes a problem in that the structure of the food frying machine 51 itself is complicated and the production cost thereof is accordingly increased.

Furthermore, since the fin 57 having a cross-shaped section is disposed in the heat leading passage 56 in a fixed state, it becomes difficult to eliminate soot or the like which is adhered to the deep side (upward side) of the heat leading passage 56 of the fin 57, wherein cleaning work of the burner portion 55 is made cumbersome, and since the bottom portion 53 of the oil tank 52 is made roughly horizontal, the sediment is deposited on the bottom portion 53, and become cumbersome to eliminate the sediment. That is, there is a problem in that the maintenance of a food frying machine 51 itself is not easily carried out.

Furthermore, in a food frying machine 151 according to another conventional example, since a combustion gas passage 160 communicating with the combustion chamber 156 is merely installed downward of the bottom portion 153a of the oil tank 153 and rearward of the rear portion 153b, it is difficult to cool down the outside plate member 160a of the combustion gas passage 160, wherein the outside plate of the casing 152 is apt to be highly heated. In particular, the rear surface plate 152a of the casing 152 is disposed roughly close to the outside plate member 160a of the combustion gas passage 160 formed outside the rear portion 153b of the oil tank 153. Therefore, the temperature of the outside plate member 160a is directly transmitted to the rear surface plate 152a, wherein the temperature thereof is apt to be highly increased.

As a result, in a case where such a food frying machine 151 is installed for use at a cooking place, there is a fear that the temperature of the left and right side plates and upper surface plate, which are connected to the rear side plate 152a of the casing 152 is raised to such a degree that a user can not touch the machine with his hand, and in particular since the temperature of the rear side plate 152a of the casing 152 is apt to be raised, vacant space of an appointed interval is required rearward of the casing 152, whereby such a problem arises, by which the installation space was developed in view of the abovementioned shortcomings and problems, and it is therefore an object of the invention to provide a liquid heating apparatus which is cheap in its production cost with a simplified structure, by which easy maintenance can be secured, wherein fins are fixed directly to the bottom portion of the liquid tank to secure sufficient heat efficiency.

Another object of the invention is to provide a liquid heating apparatus in which a temperature rise of the outside plate of the casing is efficiently suppressed by effectively cooling the plate members which form a combustion gas passage, and the installation space efficiency can be improved.

In order to achieve the abovementioned objects, one aspect of the invention is characterized in that, in a liquid heating apparatus which raises the temperature of liquid in a liquid tank by heating the bottom of the liquid tank with a burner disposed downward of the bottom of the liquid tank, an inclination plane is inclined at an appointed predetermined degree of angle and is formed on the bottom of the liquid tank, long fins are fixed on the rear side of the inclination plane along the inclination direction thereof, and the fins are provided with thermal expansion absorbing means, which are able to absorb thermal expansion, along the lengthwise direction thereof.

With such a construction, the temperature of liquid is raised in line with the inclination plane of the bottom portion of the liquid tank being heated by combustion of a burner while the combustion gas of the burner is caused to flow through the fins fixed at the rear side of the heating surface along the inclination plane. Since the fins are fixed by a thermal expansion absorbing means in a state where the fins are closely adhered to the rear side of the inclination plane, at least the fixed portion thereof becomes a heat transmission portion to increase the transmission area, whereby heat efficient fins are provided so as to protrude from the rear side of the inclination plane. Therefore, the shape of the fins is simplified to make maintenance easy.

Furthermore, the fins can be formed to be roughly channel-like in their cross section, and the bottom wall portion can be adhered to and fixed at the rear side of the inclination plane of a liquid tank. With such a construction, since the bottom wall portion of the fins having a channel-like section is adhered to and fixed at the rear side of the inclination plane, a sufficient heat transmission area from the fins to the inclination plane can be obtained, and the side wall portions at both sides of the bottom wall portion also become heat transmission portions, thereby causing the heat receiving area to be increased, wherein heat efficiency is further increased.

The thermal expansion absorbing means can be slits formed at the side wall portions protruding from the rear side of the inclination plane of the fins. The thermal expansion absorbing means can also be provided in the form of differences in the protrusion dimension of both end portions in the lengthwise direction of the side wall portions protruding from the rear side of the inclination plane of the fins.

With such a construction, the thermal expansion of the fins can be absorbed by the slits formed at an appointed interval along the lengthwise direction of the fins and differences in the protrusion dimension of both end portions in the lengthwise direction of the fins, whereby warping, etc., of the fins in the lengthwise direction can be prevented from occurring, wherein the fins are fixed close to the inclination plane, and the heat transmission area is increased to improve heat efficiency.

A low temperature portion protruding downward of the inclination plane can be provided on the bottom of the liquid tank. With such a construction, since sediment naturally drops on the inclination plane and is accumulated in the low temperature portion, the sediment is not heated, and the liquid in the liquid tank can be prevented from deteriorating in quality. In addition, since it becomes easy to clean up the bottom of the liquid tank, maintenance can be made further easy.

By employing one construction of the invention, combustion gas can be generated in line, with the combustion gas heating the bottom of the liquid tank with the heat flowing from the upstream side to the downstream side in the combustion gas passage. The combustion gas passage is raised by flow of the combustion gas. However, the plate member is cooled down by cooling air flowing in the cooling air passage formed outside thereof.

Since the downstream side of the cooling air passage and the downstream side of the combustion gas passage are joined to each other, the cooling air in the cooling air passage is absorbed by a draft generated by the difference in temperature at the confluence. By the absorption force, it is possible to increase the flow quantity of cooling air flowing in the cooling air passage while the burner is in combustion, the outside plate member of the combustion gas passage is effectively cooled, wherein the temperature rise of the outside plate of the casing, which is disposed outside the cooling air passage, is suppressed, and there is no need to provide wide vacant space rearward of the casing when installing the apparatus. Therefore, installation space efficiency can be improved.

The confluence of the combustion gas passage and the cooling air passage can be provided at the upper part of the rear side of the liquid tank. With such a construction, since it is possible to release the combustion gas and cooling air into the atmosphere at the upper part of the rear side of the liquid tank, the temperature rise of the rear side plate of the casing can be further suppressed.

The opening at the upstream side of the cooling air passage can be provided at the bottom portion of the casing which accommodates and arranges the liquid tank. With such a construction, since the temperature on the floor in a cooking place, on which this type of a liquid heating apparatus is installed, is generally lowered due to use of water, air (cool air) on the floor whose temperature is low can be taken in through the opening at the bottom portion of the apparatus, and the cooling effect of the combustion gas passage can be further increased.

The above and other advantages of the invention will become apparent in conjunction with the accompanying claims and drawings wherein like reference numerals refer to like parts.

DETAILED DESCRIPTION OF THE PREFERRED EMBODIMENTS

Hereinafter, a detailed description is given of a preferred embodiment of the invention with reference to the accompanying drawings.

Figure 1:
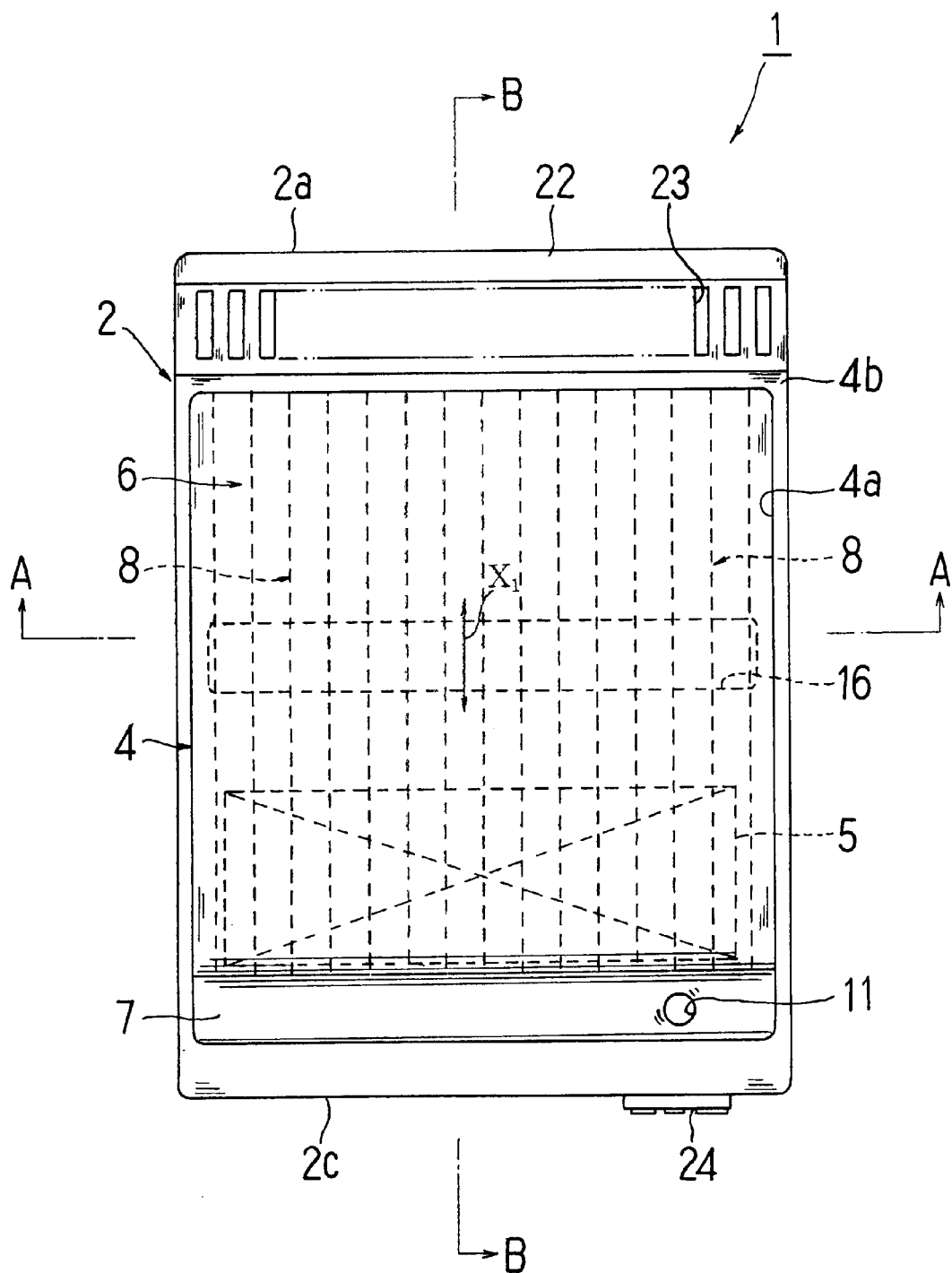
FIG. 1 is a plan view showing a preferred embodiment of a liquid heating apparatus according to the invention.
Figure 2:
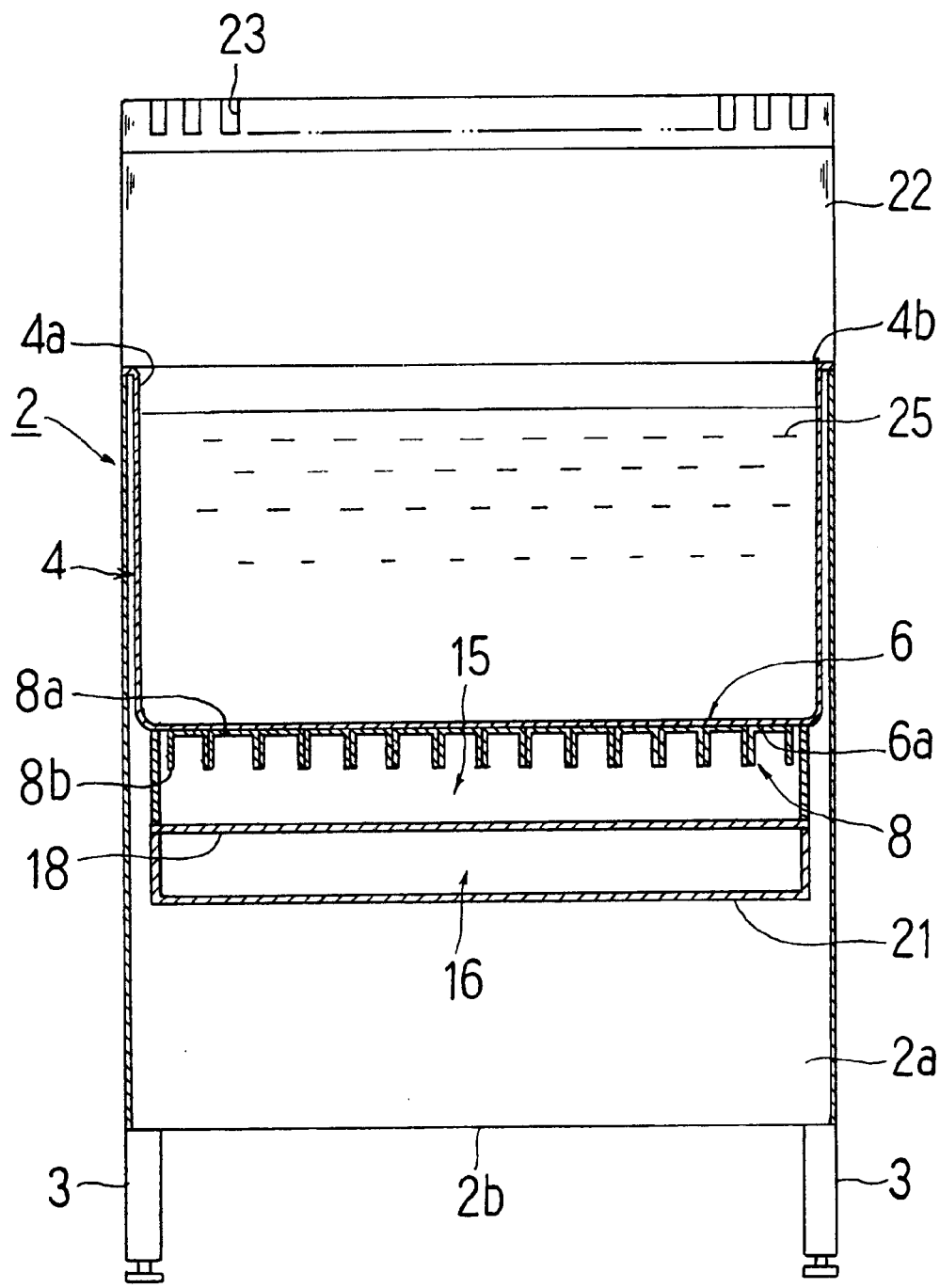
FIG. 2 is a sectional view shown by the arrow A—A in FIG. 1.
Figure 3:
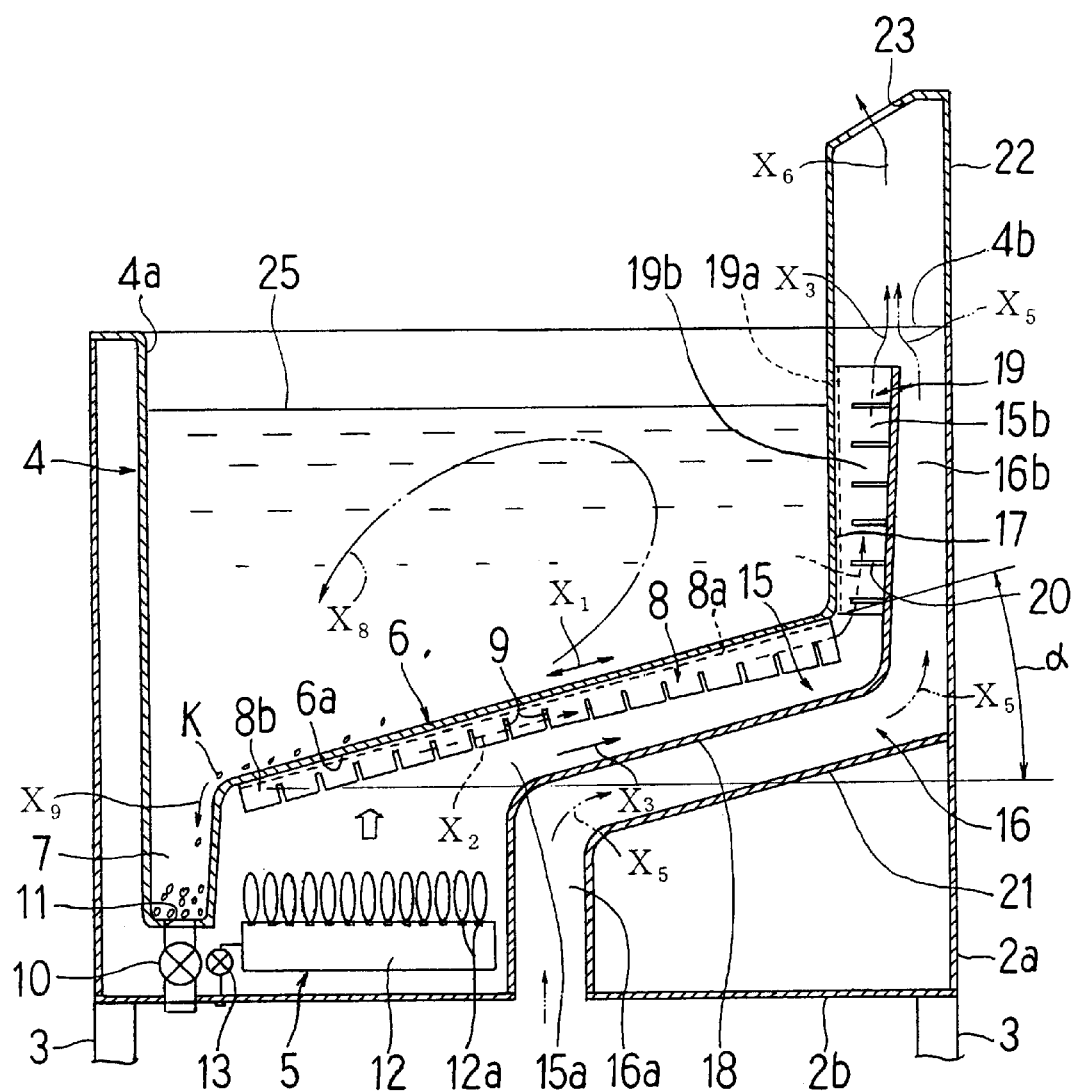
FIG. 3 is a sectional view shown by the arrow B—B in FIG. 1.
Figure 4:
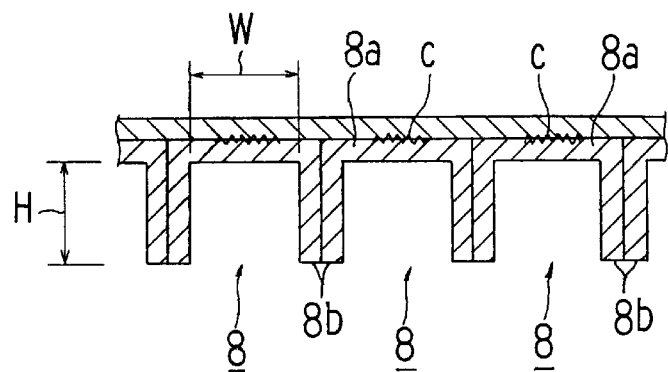
FIG. 4 is a sectional view of the fins.
Figure 5:
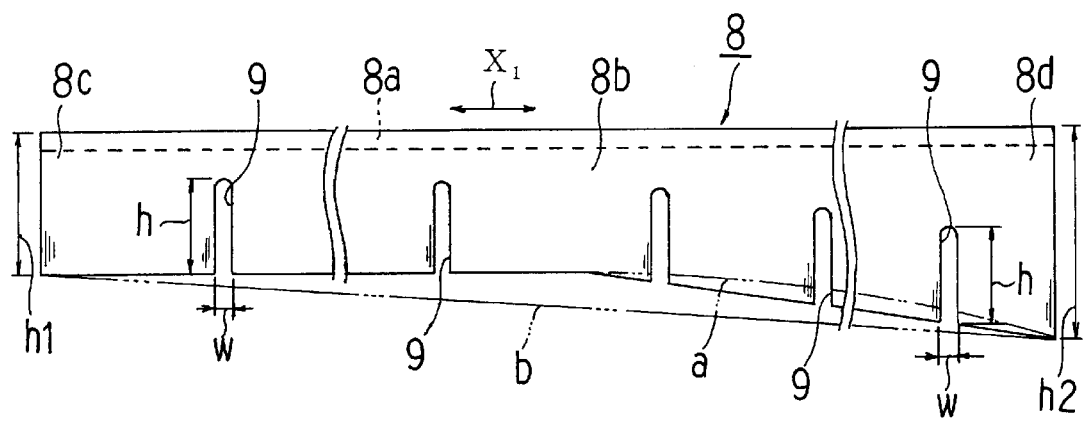
FIG. 5 is a side view of the fins.

FIG. 1 through FIG. 5 show a preferred embodiment of a liquid heating apparatus according to the invention, wherein FIG. 1 is a plan view thereof, FIG. 2 is a cross-sectional view taken by the arrow A—A of FIG. 1, FIG. 3 is a sectional view taken by the arrow B—B of FIG. 1, FIG. 4 is a sectional view of a fin, and FIG. 5 is a side view thereof.

In FIG. 1 through FIG. 5, a liquid heating apparatus 1 has a roughly rectangular parallelepiped casing 2 having four legs 3 at the lower part thereof. A liquid tank 4 is disposed in the casing 2, and a gas burner 5 is disposed at the lower part of the liquid tank 4. The liquid tank 4 is formed to be a roughly rectangular parallelepiped having an opening 4a at the upper part thereof. An inclination plane 6 and a low temperature portion 7, which is installed so as to protrude downward from the inclination plane 6, he are formed on the bottom portion.

The inclination plane 6 is inclined from the rear side toward the front side along the lengthwise direction $X_1$ being the front and rear direction of the liquid tank 4 at an appointed degree of angle (for example, angle α (in FIG. 3)=15 deg. through 40 deg., preferably, α=30 deg.), and a plurality of fins 8 are fixed so as to protrude at the rear side 6a of the inclination plane 6. These fins 8 are, as shown in FIG. 4 and FIG. 5, formed to be like a channel which has a bottom wall portion 8a and a pair of side wall portions 8b. They are set so that the width W of the bottom portion 8a and the height of the side wall portions 8b are made roughly the same.

Furthermore, a number of slits 9 each having a width w and a depth h are formed at an appointed interval along the lengthwise direction of the fins 8 at the side wall portions 8b of the fins 8, and they are further formed so as to have different heights h1 and h2 (protrusion dimension) of both end portions 8c and 8d of the fins 8. That is, the fins 8 are designed so that their height dimension is made linearly greater from a roughly middle portion toward the end portion 8d side in the lengthwise direction, whereby the height dimension h2 of the end portion 8d is set so that it becomes greater by an appointed dimension (protrusion dimension difference=h2-h1) than the height dimension h1 of the end portion 8c.

Furthermore, as a way of making the height dimensions h1 and h2 at both end portions 8c and 8d of the fins 8 different from each other, the height dimensions may be set so that they become greater by turns like a curved line from the roughly middle portion in the lengthwise direction of the fins 8, for example, as shown with a chain At double-dashed line a in FIG. 5. As shown by a chain triple-dashed line b in FIG. 5, the height dimensions may be set so that they become linearly (or like a curved line) greater by turns from the end portion 8c toward the end portion 8d. By the slits 9 thus constructed and differences in the height dimensions of both end portions 8c and 8d, warping of the fins 8 in the lengthwise direction resulting from thermal expansion can be absorbed as described later.

Subsequently, the fins 8 are constructed so that a portion c in FIG. 4 of the bottom wall portion 8a is welded and fixed integral with the rear side 6a of the inclination plane 6 by seam welding so as to roughly extend over the total length of the lengthwise direction $X_1$ (the same direction as the lengthwise direction $X_1$ of the liquid tank 4) on the rear side 6a of the inclination plane 6 of the liquid tank 4.

On the other hand, the low temperature portion 7 formed at the bottom portion of the liquid tank 4 is provided downward from the lower edge of the inclination plane 6, that is, downward at one end in the lengthwise direction $X_1$ of the liquid tank 4, and a liquid discharge portion 11, to which a liquid drain valve 10 (See FIG. 3) is attached, is formed at one end side of the lengthwise direction (the direction orthogonal to the lengthwise direction $X_1$ of the liquid tank 4) of the bottom of the low temperature portion 7.

Furthermore, the gas burner 5 disposed at the lower part of the liquid tank 4 is a Bunsen type gas burner, wherein the entire shape of the gas burner 5 is formed to be a slender rectangular parallelepiped, and is internally provided with a mixture tube, pressure regulators (not illustrated), a burner head 12 having a number of flame ports 12a, and a gas valve 13 (See FIG. 3).

The gas burner 5 is disposed rearward of the low temperature portion 7 downward at the front side of the inclination plane 6 of the liquid tank 4, and is arranged so that the flame portions 12a of the burner head 12 are located downward of an appointed a the installation spacing between the gas burner 5 and the rear surface 6a of the inclination plane 6 is determined so that, for example, the interval between the tip end of the flame of the flame portions 12a at the extreme rear side of the burner head 12 and the rear surface 6a of the inclination plane 6 thereabove roughly becomes 100 mm or so.

A combustion gas passage 15 and a cooling air passage 16 are formed at the upper part rearward of the gas burner 5 in the casing 2. The combustion gas passage 15 is formed along the inclination plane 6 and rear plane 17 (See FIG. 3) of the liquid tank 4 between these planes and a shielding plate 18, which is provided opposite to these planes 6 and 17, acting as the outside plate member of the combustion gas passage 15. The abovementioned fins 8 are positioned inside the inclined upstream side 15a of the combustion gas passage 15 while long fins 19 (See FIG. 3) secured along the vertical direction of the rear plane 17 of the liquid tank 4 are positioned inside the vertical downstream side 15b of the combustion gas passage 15 formed by the rear plane 17 of the liquid tank 4 and the shielding plate 18.

The fins 19 are also formed to have a channel-like section, similar to the abovementioned fins 8, and slits 20 are formed at the side wall portions 19b while the bottom wall portion 19a is welded and fixed on the rear plane 17 of the liquid tank 4 by seam welding. Furthermore, the fins 19 are provided in a state where they are continuous to the fins 8 (that is, in a state where the concave portions of both fins 8 and 19 are made linear in the plan view), and the tip end of the side wall portions 19b of the fins 19 are brought into contact with the shielding plate 18. Furthermore, it is designed so that the upper end of the shielding plate 18 which sets the position at the downstream side 15b of the combustion gas passage 15 is positioned to be slightly lower than the upper end plane 4b of the liquid tank 4.

The cooling air passage 16 formed downward of and outside the combustion gas passage 15 has a passage plate 21 secured downward of the shielding plate 18 at an appointed interval, and the upper end portion of the passage plate 21 is connected to the rear plate 2a of the casing 2, whereby a gap is formed between the lower portion of the passage plate 21 and that of the shielding plate 18 and between the upper portion of the rear plate 2a of the casing 2 and that of the shielding plate 18. The gap constitutes a cooling air passage 16, and the end portion at the upstream side 16a of the cooling air passage 16 is exposed to the bottom plate 2b portion of the casing 2.

Furthermore, the end portion at the downstream side 16b of the cooling air passage 16 is joined to the combustion gas passage 15 at the upper end portion of the shielding plate 18 and is connected to an exhaust duct 22 fixed at the rear portion of the upper end portion 4b of the liquid tank 4. The exhaust duct 22 is disposed so that the tip end thereof protrudes by an appointed dimension upward of the upper end portion 4b of the liquid tank 4, and is provided with a number of exhaust openings 23 formed on the upper surface thereof. By the exhaust duct 22, the downstream side 16b of the cooling air 16 passage 16 are joined to each other and exposed to the atmosphere.

Furthermore, an operation panel 24 (See FIG. 1) which is provided with a power breaker, which controls operations of the gas burner 5, and a temperature setter, etc., is disposed on the front panel 2c of the casing 2. The respective face plates 2a through 2c of the liquid tank 4, fins 8 and 19, shielding plate 18, passage plate 21 and casing 2 are made of stainless steel plates.

Next, a description is given of operations of the abovementioned liquid heating apparatus 1. First, liquid 25 such as water or oil (edible oil), etc., is stored at an appointed quantity in the liquid tank 4, the temperature is set on the operation panel 24, and gas and air are supplied into the mixture tube after opening the gas valve 13 to cause the burner to burn. As the gas burner 5 begins burning, the combustion gas is discharged upward and flows through the combustion gas passage 15 from the upstream side 15a to the downstream side 15b.

Most of the combustion gas is caused to flow in the arrow direction $X_2$ in FIG. 3 in the respective fins 8, and a part thereof is caused to flow in the combustion gas passage 15 as shown by the arrow $X_3$. Subsequently, the combustion gas flowing in the fins 8 flows while being brought into contact with the bottom wall portion 8a of the fins 8 having a channel-like section and the inside of the side wall portions 8b at both ends thereof, thereby causing the temperature of the fins 8 to be raised.

At this time, the bottom wall portion 8a of the fins 8 having a channel-like section is directly fixed on the rear side 6a of the inclination plane 6, and the side wall portions 8b are provided adjacent and close thereto. Therefore, three sides of the bottom wall portion 8a and side wall portions 8b of the fins 8 directly receive heat of the combustion gas and form a heat transmission face by which the heat is transmitted to the inclination plane 6. The heat of the combustion gas flowing in the respective fins 8 is transmitted to the side wall portions 8b of the adjacent fins via the corresponding side wall portions 8b. That is, one fin 8 forms five transmission planes in appearance.

As the temperature of the fins 8 is raised by the heat of the combustion gas directly flowing in the fins 8 and the heat of the combustion gas flowing in the combustion gas passage 15 outside the fins 8, the heat is transmitted to the inclination plane 6 on the bottom of the liquid tank 4, thereby causing the temperature of the inclination plane 6 to be raised. Therefore, the liquid 25 in the liquid tank 4 is raised to an appointed temperature level while generating a convection as shown by the arrow $X_8$ in FIG. 3.

When the gas burner 5 burns for an appointed period of time and the fins 8 are heated to an appointed temperature level by combustion gas flown in the upstream side 15a of the combustion gas passage 15, the fins 8 (in particular, the tip end of the fins) are thermally expanded to cause a force, by which the fins 8 are made to warp in the lengthwise direction, and operate. However, the force is absorbed by the slits 9 secured at the side wall portions 8b of the fins 8, stress resulting from warping can be prevented from operating on the inclination plane 6 of the liquid tank 4, on which the side wall portions 8a of the fins 8 are secured and fixed. Furthermore, since slits 20 are also formed in the lengthwise direction at the fins 19 provided at the downstream side 15b of the combustion gas passage 15, action of the stress from warping of the fins 19 onto the rear side 4b of the liquid tank 4 can be suppressed. Since combustion gas is caused to flow from the upstream side 15b to the downstream side 15b of the combustion gas passage 15, the temperature of the shielding plate 18 which forms the combustion gas passage 15 is raised. However, the shielding plate 18 is cooled down by the cooling air passage 16 secured downward thereof. That is, whereby combustion of the gas burner 5, the combustion gas flows in the combustion gas passage 15 and is exhausted from the end portion of the downstream side 15b into the exhaust duct 22 as shown by the arrow $X_4$, a draft occurs at the outlet of the combustion gas passage 15 since the temperature of the combustion gas itself is high and the temperature of air in the cooling air passage 16 is lower than this.

The air in the cooling air passage 16 is absorbed in the direction of the exhaust duct 22 by the draft and the quantity of air flow from the upstream side 16a toward the downstream side 16b of the cooling air passage 16 as shown by the arrow $X_5$ is increased, whereby the shielding plate 18 can be efficiently cooled down by the air. In particular, since the opening of the upstream side 16a of the cooling air passage 16 is provided at the bottom plate 2b of the casing 2, air (cool air), the temperature of which is lower, existing on the floor of an installation place of the liquid heating apparatus 1, where water is used, is taken in, wherein the shielding plate 18 is efficiently cooled by the air. Furthermore, there is no case where the temperature of the rear plate 2a of the casing 2 is raised to, for example, such a higher temperature that a user can not touch the machine with his hand. And the exhaust gas joined in the exhaust duct 22 at the downstream sides 15b and 16b of the combustion gas passage 15 and cooling air passage 16 is discharged from the exhaust opening 23 of the exhaust duct 22 to the outside as shown by the arrow $X_6$.

Thus, in the liquid heating apparatus 1 according to the abovementioned on the bottom portion of the liquid tank fixed on the rear side 6a of the inclination plane 6 along the lengthwise direction $X_1$, combustion gas produced when the gas burner 5 burns flows between the fins 8, and the heat transmitting area can be increased by the fins 8. Therefore, heat efficiency can be improved. In particular, since the fins 8 are formed to be roughly channel-like in their cross section and slits 9 are formed at the side wall portions 8b at an appointed interval, warping produced due to thermal expansion of the fins 8 can be absorbed by the slits 9, wherein it is possible to prevent the inclination plane 6 of the liquid tank 4 from being deformed, and possible to fix the entire length of the bottom wall portions 8b of the fins 8 close to the rear surface 6a of the inclination plane 6. Thereby, satisfactory heat effects can be obtained.

Furthermore, since the side wall portions 8b at both sides of the bottom wall portions 8a of the fins 8 are adhered to each other, the appearance heat transmitting area effected by the fins 8 can be remarkably increased, the heat efficiency can be further increased. As a result, liquid 25 in the liquid tank 4 can be raised to an appointed temperature level in a remarkably short time. If the abovementioned liquid heating apparatus 1 is used as, for example, a noodle boiling machine, etc., it is possible to perform an efficient boiling work for noodles.

Furthermore, since the fins 8 are channel-like in their cross section, and the bottom wall portions 8a are secured and fixed on the rear side 6a of the flat inclination plane 6 of the liquid tank 4, the shape of the fins 8 themselves can be simplified, and no conventional concave heat leading passage is required on the inclination plane 6. Therefore, the construction of the fins 8 and liquid tank 4 is simplified, thereby causing the production cost of the liquid heating apparatus 1 to be decreased, and it is possible to easily attach the fins 8 to the inclination plane 6 by seam welding, etc.

Furthermore, since the inclination plane 6 and low temperature portion 7 are formed on the bottom of the liquid tank 4, the sediment K produced in the liquid tank 4 can be automatically dropped and deposited in the low temperature portion 7 via the inclination plane 6 as shown by the arrow $X_9$ in FIG. 3. For example, it is possible to eliminate the sediment K through an opening 4a of the liquid tank 4 or to eliminate it by opening the liquid exhaust valve 10. Therefore, it is possible to easily clean up the liquid tank 4, and since the sediment K is deposited in the low temperature portion 7, the sediment K is not circulated in the liquid tank 4 and the liquid 25 can be prevented from becoming dirty.

Furthermore, since the fins 8 are open between their side wall portions 8b, soot or the like which is adhered to the fins 8 can be easily removed by using a brush, etc., and make it possible to easily clean up the gas burner 5 portion. In particular, since the gas burner 5 is attached to the side of the low temperature portion 7 at the lower part of the inclination plane 6 of the liquid tank 4, the front side of the fins 8 can be exposed to the outside by only removing the gas burner 5, the cleaning thereof can be further simplified than that of the conventional examples. Judging from the abovementioned, the maintenance of the liquid heating apparatus 1 can be easily carried out.

Thus, in the liquid heating apparatus 1 outside the combustion gas passage 15 secured at the lower part of the inclination plane 6 of the liquid tank 4 and rearward of the rear side 17, the shielding plate 18 of the combustion gas passage 15 can be cooled down from the outside by air flowing in the cooling air passage 16. Resultantly, the temperature of the rear side plate 2a of the casing 2, left and right side plates and top surface plate, which are connected thereto, can be prevented from rising, and it is possible to maintain the temperature of the outside plate of the casing 2, for example, at such a degree that a cook may touch the machine.

Furthermore, the downstream side 16b of the cooling air passage 16 and the downstream side 15b of the combustion gas passage 15 are jointed to each other at the upper part of the rear side 17 of the liquid tank 4 and are exposed to the atmosphere by the exhaust duct 22, a cooling air passage 15 can be formed between the rear side plate 2a of the casing 2, where in particular, the temperature thereof is apt to be raised, and the rear side 17 of the liquid tank 4, and the temperature rise of the rear side plate 2a can be suppressed without fail. Therefore, by utilizing a draft generated at the confluence of the cooling air passage 16 and combustion gas passage 15, the cooling air is attracted into the cooling air passage 16, wherein no attraction fan is required, and the construction is simplified. Therefore, it is possible that cooling air can be effectively taken in.

Furthermore, since the downstream side of the cooling air passage 15 is exposed to the bottom plate 2b of the casing 2, cool air on the floor of a cooking place, the temperature of which is lowered due to use of water, etc., can be taken into the cooling air passage 16, and more effective cooling of the shielding plate 18 of the combustion gas passage 15 can be carried out.

Furthermore, since heat efficiency can be increased because of an increase of the heat absorption of the fins secured and fixed on the rear side 6a of the inclination plane 6 of the liquid tank 2, warping, etc., of the fins 8 due to thermal expansion can be absorbed by dimension differences between the slits 9 of the fins 8 and both end portions 8c and 8d thereof, wherein it is possible to prevent the inclination plane 6 of the liquid tank 4 from being deformed, and since the entire length of the bottom wall portions 8a of the fins 8 can be fixed in a close state on the rear side 6a of the inclination plane 6, satisfactory heat transmission effects can be obtained.

Furthermore, since the inclination plane 6 and low temperature portion 7 are formed at the bottom portion of the liquid tank 4, sediment K generated in the liquid tank 4 can be automatically dropped and deposited in the low temperature portion 7 via the inclination plane 6 as shown by the arrow $X_9$ in FIG. 3, and the liquid tank 4 can be easily cleaned up. Furthermore, since the sediment K is deposited in the low temperature portion 7, the sediment K is not circulated as convection in the liquid tank 4, and it is possible to prevent the liquid 25 from becoming dirty. Furthermore, since the fins 8 are open between the side wall portions 8b thereof, soot or the like adhered to the fins 8 can be simply eliminated by a brush, etc., and the gas burner 5 portion can be easily cleaned up. Therefore, it is possible to easily carry out maintenance of the liquid heating apparatus 1.

Furthermore, although, in the abovementioned preferred embodiment, the fins 8 are formed to be channel-like in their cross section and are attached to the rear side 6a of the inclination plane 6 of the liquid tank 4 with the side wall portions 8b adhered to each other, this method of fixing fins 8 according to the invention is not limited to the abovementioned embodiment. For example, they may be secured and fixed as shown in FIG. 6 through FIG. 8.

Figure 6:
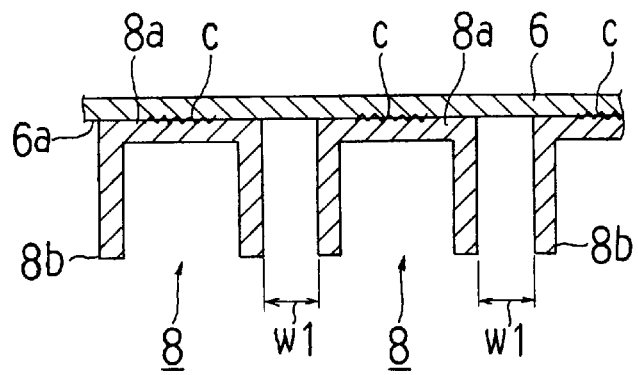
FIG. 6 is a sectional view showing another example of the fins.
Figure 7:
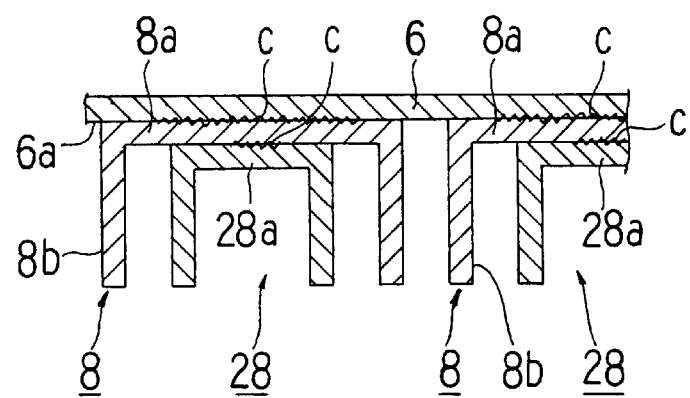
FIG. 7 is a sectional view showing still another example of the fins.
Figure 8:
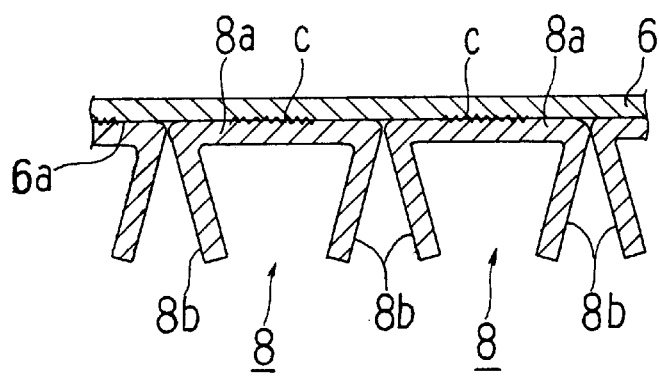
FIG. 8 is a sectional view showing further another example of the fins.

That is, as shown in FIG. 6, fins 8 having a channel-like cross section are fixed in a mutually juxtaposed state at an appointed interval W1, and as shown in FIG. 7, the outside of the side wall portions 8a of comparatively large fins 8 having a channel-like cross-section are directly fixed on the rear side 6a of the inclination plane 6, and the bottom wall portions 28a of the smaller fins 28 having a channel-like cross-section than that of the fins 8 are secured and fixed inside the bottom wall portions 8a of the fins 8. Still furthermore, as shown in FIG. 8, the tip end sides of the side wall portions 8b of the fins 8 are bent inward to an appointed degree of angle, and the bottom wall portions 8a are directly fixed on the rear side 6a of the inclination plane 6.

Even though the abovementioned components are thus constructed, combustion gas is caused to flow in the fins 8 and 28 as in the fins 8 in the abovementioned preferred embodiment, and combustion gas is further caused to flow in spacing (between the respective fins 8) formed between the side wall portions 8b and 28b of the respective fins 8 and 28. Actions and effects, which are roughly the same as those in the abovementioned embodiment, can be obtained.

Furthermore, in the abovementioned preferred embodiment, a description was given of a case where the liquid tank 4 is provided with an inclination plane 6 and a low temperature portion 7. However, a liquid tank 4 according to the invention may be also applicable as, for example, a liquid tank 4 for which only the inclination plane 6 is formed without being provided with any low temperature portion 7 at the bottom portion of the liquid tank 4, and the shape of the inclination plane 6 is not limited to such that an inclination plane is inclined from the rear side toward to the front side. For example, it is applicable to a so-called pan type liquid tank 4 in which, in a case where the liquid tank 4 is made circular in its plan view, the inclination plane is conically inclined from the outer circumferential portion toward the center.

Furthermore, although, in the abovementioned embodiment, a description was given of a case where the slits 9 and 20 of the fins 8 and 19 have the same width w and depth h and they are installed at a fixed interval, for example, the shape of the slits 9 and 20 may be made different along the lengthwise direction of the fins 8 and 19 and they may be installed with their intervals made different from each other. Still furthermore, although, in the abovementioned embodiment, a description was given of a case where slits 9 are provided at the fins 8 as a thermal expansion absorbing means and a protruding dimension difference is given in the lengthwise direction, for example, it may be acceptable that the protrusion dimension in the lengthwise direction of the fins 8 is made uniform with only the slits 9 provided, and that only the protrusion dimension difference is provided to absorb the thermal expansion by eliminating the slits 9. Moreover, adequate variations and modifications are available in compliance with the thickness and shape of the fins 8.

Figure 9:
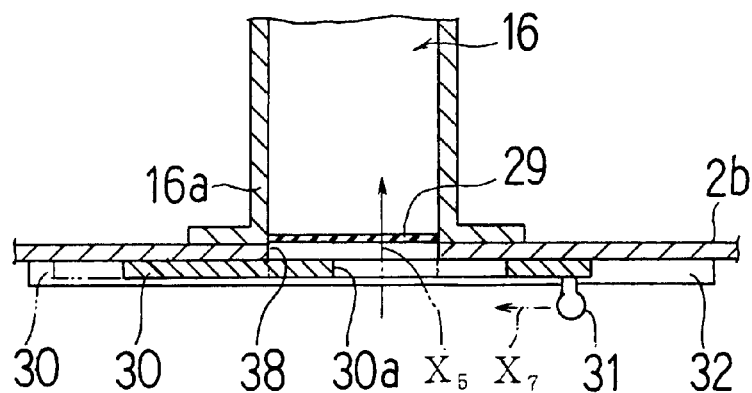
FIG. 9 is a sectional view showing another example of a connection structure at the upstream side of a cooling air passage.
Figure 10:
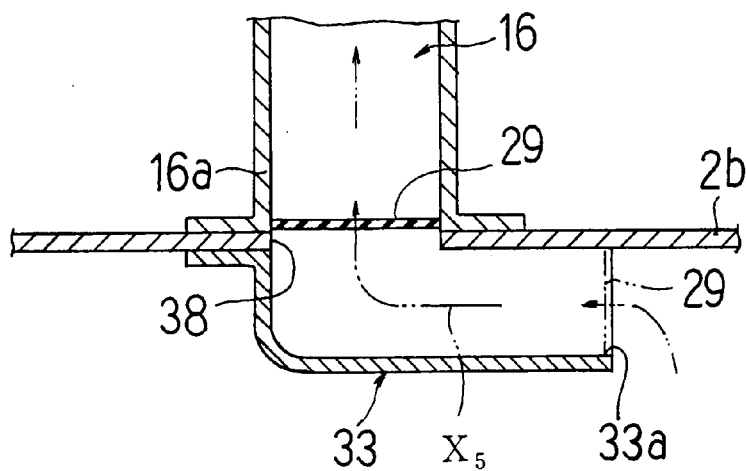
FIG. 10 is a sectional view showing still another example of a connection structure at the upstream side of a cooling air passage.
Figure 11:
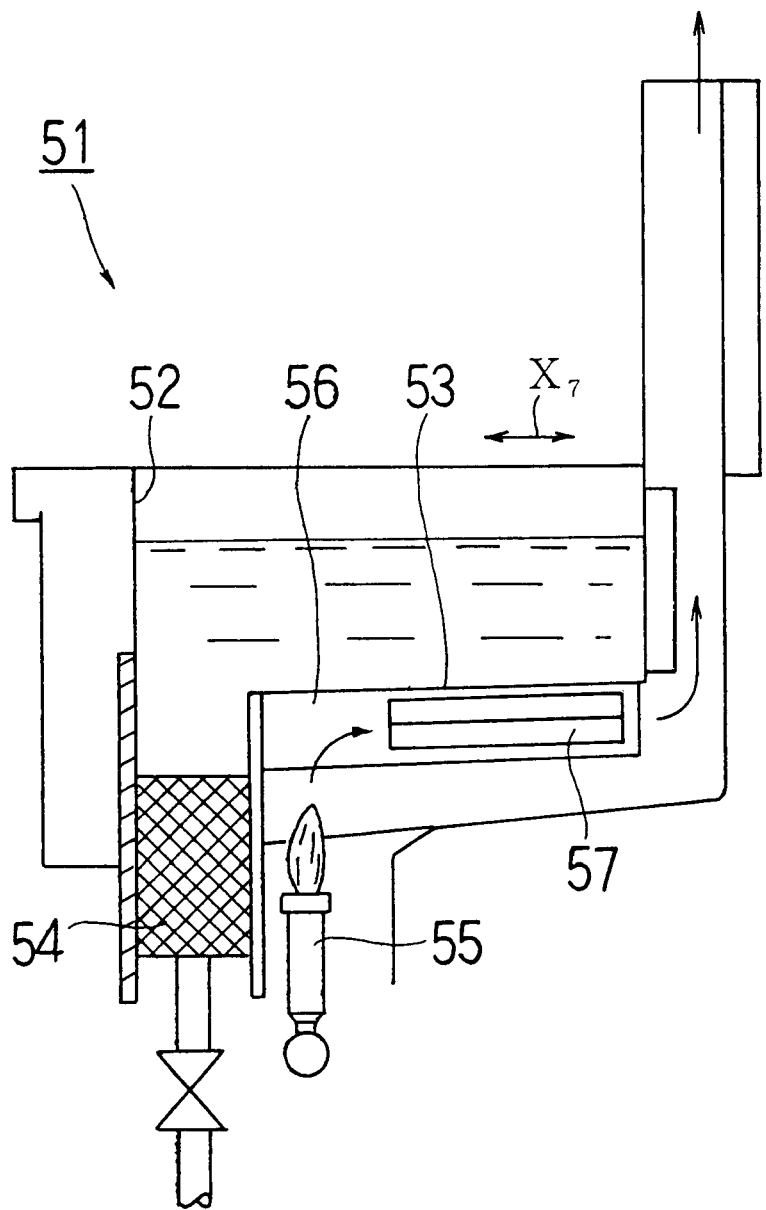
FIG. 11 is a rough side view of a conventional liquid heating apparatus.
Figure 12:
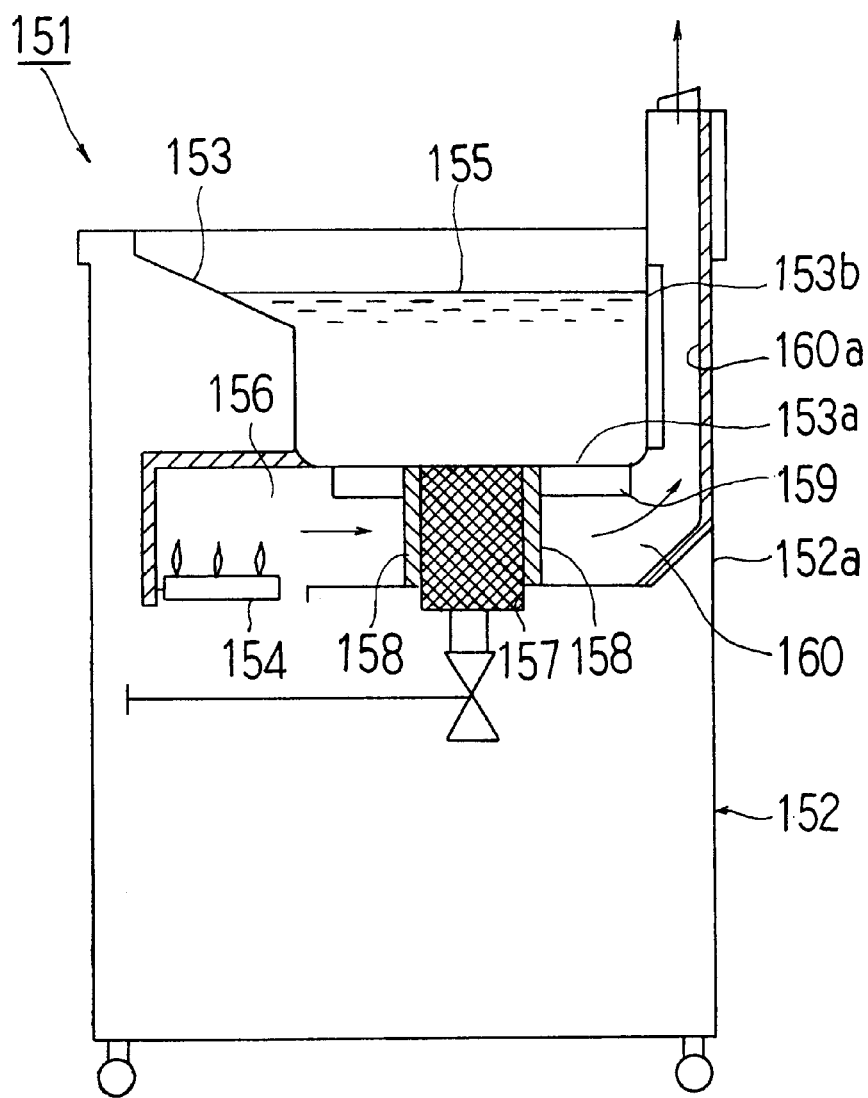
FIG. 12 is a rough sectional view of another conventional liquid heating apparatus.

FIG. 9 and FIG. 10 are sectional views showing other embodiments of a connection structure of attaching the upstream side 16a of the cooling air passage 16 onto the bottom plate 2b of the casing 2. Parts, which are similar to those in the abovementioned embodiment, are given the same reference numbers for description. In the connection structure shown in FIG. 9, the end portion of the upstream side 16a of the cooling air passage 16 is fixed on the rear side of the opening 38 portion of the bottom plate 2b of the casing 2, and a filter 29 which prevents dust and dirt from invading the cooling air passage 16 is disposed in the opening 38, wherein a slidable opening and closing plate 30 is provided outside the opening 38.

The opening and closing plate 30 is provided with an opening 30a having, for example, the same shape as that of the opening 38 of the bottom plate 2b. By operating an operation portion 31 fixed at the end part thereof it is constructed so as to be slidable along a rail 32 fixed at the bottom plate 2b as shown by the arrow X_7. According to the connection structure, it is possible to regulate the quantity of air which is taken into the cooling air passage 16 by sliding operations of the opening and closing plate 30, whereby it will become possible to carry out cooling of the combustion gas passage 15 best suitable for the combustion level of the gas burner 5 and the conditions of an installation place of the liquid heating apparatus 1.

Furthermore, in the connection structure shown in FIG. 10, a cover 33 which has an opening 33a along the outside of the bottom plate 2b is attached to the outside of the opening 38 portion of the bottom plate 2b of the casing 2. The opening 33a portion of the cover 33 may be set in any adequate direction, depending upon the conditions of the installation place, wherein by the cover 33, it is possible to prevent cool air on the floor from being absorbed directly through the opening 38. Therefore, for example, attraction of dust and dirt on the floor into the cooling air passage 16 can be suppressed. Furthermore, in the connection structure, a filter 29 may be installed at the opening 33a portion of the cover 33.

Furthermore, in the abovementioned embodiment, a description was given of a case where the liquid tank 4 is provided with an inclination plane 6 and a low temperature portion 7. However, a liquid tank 4 according to the invention may be applicable as a liquid tank 4 having only the inclination plane 6 formed without forming any low temperature portion 7 at the bottom portion of the liquid tank 4, or as a liquid tank 4 with a flat bottom. Furthermore, the shape of the inclination plane 6 is not limited to an inclination plane, which is inclined from the rear side to the front side. For example, it is applicable to a so-called pan type liquid tank 4 in which, in a case where the liquid tank 4 is made circular in its plan view, the inclination plane is conically inclined from the outer circumferential portion toward the center.

Furthermore, in the abovementioned embodiment, the upstream side 16a of the cooling air passage 16 is made exposed to the bottom plate 2b of the casing 2. However, for example, the upstream side 16a may be made open at the lower part of the left or right side plate of the casing 2. In the abovementioned embodiments, the size of the combustion gas passage 15 and cooling air passage 16, the position of the confluence thereof is one of the examples. It is needless to say that they may be subjected to various modifications and variations without departing from the spirit of the invention.

As described in detail, according to one aspect of the invention, since an inclination plane can be formed at the bottom portion of a liquid tank and long fins each having a thermal expansion absorbing means are secured and fixed at the rear side of the inclination plane along the inclination direction, the fins can be fixed in a state closely adhered to the inclination plane, and combustion gas of a burner is caused to flow between the fins, wherein the heat transmitting area is able to be increased, and sufficient heat efficiency can be obtained.

Furthermore, the fins and liquid tank can be simplified in shape, and the liquid heating apparatus is simplified to contribute to a lowering of the production cost. Furthermore, the burner portion can be easily cleaned up due to the protruding fins, or it becomes simple to eliminate sediment from the bottom portion of the liquid tank by virtue of the inclination plane. Therefore, such an effect can be obtained, by which the maintenance of the liquid heating apparatus can be easily carried out.

According to another aspect of the invention, since a cooling air passage can be formed outside the combustion gas passage, it is possible to position the chamber of the burner, from the outside by cooling air flowing in the cooling air passage. Therefore, the temperature rise of the outside plate of the casing, in which a liquid tank is accommodated, can be suppressed to a low level.

Furthermore, since the outside temperature of the casing is kept at an appointed temperature level or less, it is possible to install the liquid heating apparatus at an installation place without forming any vacant spacing behind the casing. Therefore, such an effect can be obtained, by which installation space efficiency can be improved.

What is claimed is:

1. A liquid heating apparatus which raises the temperature of liquid in a liquid tank by heating a bottom of said liquid tank with a burner disposed downward of the bottom of said liquid tank, characterized by an inclination plane which is inclined at a predetermined degree of angle and formed on the bottom of said liquid tank, said bottom being flat and positioned on said inclination plane, said inclination plane angled along a longitudinal axis of the heating apparatus, a plurality of separate fins separate from and fixed on a rear flat side of said inclination plane, said separate fins adjacent one another along the inclination direction thereof along the longitudinal axis of the heating apparatus, said fins being provided with thermal expansion absorbing means for absorbing thermal expansion along the lengthwise direction thereof.

2. A liquid heating apparatus as set forth in claim 1, wherein said fins are formed to be generally channel-like in cross section thereof and having bottom wall portions and side wall portions, the bottom wall portions thereof being fixed close to the rear side of said inclination plane.

3. A liquid heating apparatus as set forth in claim 2, wherein slits being formed at the side wall portion protruding from the rear side of the inclination plane of at least one of said fins.

4. A liquid heating apparatus as set forth in claim 2, wherein differences in protrusion dimensions occur at end portions in the lengthwise direction of the side wall portions protruding from the rear side of the inclination plane of said fins.

5. A liquid heating apparatus as set forth in claim 1, wherein a low temperature portion protruding downward from said inclination plane is provided on the bottom of said liquid tank.

6. A liquid heating apparatus as set forth in claim 2, wherein a low temperature portion protruding downward from said inclination plane is provided on the bottom of said liquid tank.

7. A liquid heating apparatus as set forth in claim 3, wherein a low temperature portion protruding downward from said inclination plane is provided on the bottom of said liquid tank.

8. A liquid heating apparatus as set forth in claim 4, wherein a low temperature portion protruding downward from said inclination plane is provided on the bottom of said liquid tank.

9. A liquid heating apparatus which raises the temperature of liquid in a liquid tank by heating a bottom of said liquid tank with a burner disposed downward of the bottom of said liquid tank, characterized by wherein an inclination plane which is inclined at an appointed degree of angle and formed on the bottom of said liquid tank, said bottom being flat and positioned on said inclination plane, said inclination plane angled along a longitudinal axis of the heating apparatus, a plurality of separate fins separate from and fixed on the rear flat side of said inclination plane, said separate fins adjacent one another along the inclination direction thereof along the longitudinal axis of the heating apparatus, said fins being formed to be generally channel-like in the cross section thereof and having bottom wall portions and side wall portions, the bottom wall portions thereof being fixed close to the rear side of the inclination plane of said liquid tank.

10. A liquid heating apparatus which raises the temperature of liquid in a liquid tank by heating a bottom of said liquid tank with a burner disposed downward of the bottom of said liquid tank, characterized by a plate member being provided outside the bottom and a rear side of said liquid tank with a predetermined space therebetween in order to form a combustion gas passage communicating with a combustion chamber of said burner and a separate cooling air passage outside said combustion gas passage along said combustion gas passage, a downstream side of said combustion gas passage and that of said cooling air passage being joined to each other at an upper part of the rear side of said liquid tank and being exposed to the atmosphere.

11. A liquid heating apparatus as set forth in claim 10, wherein an opening at the upstream side of said cooling air passage is provided at a bottom of a casing in which said liquid tank is accommodated and disposed.

* * * * *